(12) United States Patent
Levandoski et al.

(10) Patent No.: US 9,514,174 B2
(45) Date of Patent: Dec. 6, 2016

(54) CLASSIFICATION OF DATA IN MAIN MEMORY DATABASE SYSTEMS

(75) Inventors: Justin Jon Levandoski, Seattle, WA (US); Per-Ake Larson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 716 days.

(21) Appl. No.: 13/539,347

(22) Filed: Jun. 30, 2012

(65) Prior Publication Data
US 2014/0006401 A1    Jan. 2, 2014

(51) Int. Cl.
*G06F 17/30* (2006.01)

(52) U.S. Cl.
CPC .............. *G06F 17/30339* (2013.01); *G06F 17/30327* (2013.01)

(58) Field of Classification Search
CPC ............ G06F 17/30327; G06F 17/30339
USPC .......................................... 707/737
See application file for complete search history.

(56) References Cited

U.S. PATENT DOCUMENTS

| | | | |
|---|---|---|---|
| 5,544,359 A | 8/1996 | Tada et al. | |
| 5,680,573 A | 10/1997 | Rubin et al. | |
| 6,763,347 B1 | 7/2004 | Zhang | |
| 6,947,944 B1 | 9/2005 | Furuike | |
| 8,131,691 B1 * | 3/2012 | Nagaralu | G06F 17/30091 707/696 |
| 8,145,686 B2 | 3/2012 | Raman et al. | |
| 2001/0013087 A1 * | 8/2001 | Ronstrom | 711/133 |
| 2002/0078047 A1 * | 6/2002 | Hollines, III | G06F 17/30327 |
| 2004/0230623 A1 * | 11/2004 | D'Angelo et al. | 707/202 |
| 2005/0204183 A1 * | 9/2005 | Saika | G06F 11/2025 714/4.11 |
| 2006/0206675 A1 * | 9/2006 | Sato | G06F 3/0607 711/161 |
| 2006/0212459 A1 * | 9/2006 | Sugimura | G06Q 30/02 |

(Continued)

OTHER PUBLICATIONS

Park, et al., "Hot and Cold Data Identification for Flash Memory Using Multiple Bloom Filters", Retrieved at <<http://static.usenix.org/event/fast11/posters_files/Park_D.pdf>>, 9th USENIX Conference on File and Storage Technologies, Feb. 15, 2011, pp. 1-2.

(Continued)

*Primary Examiner* — Merilyn Nguyen
(74) *Attorney, Agent, or Firm* — Alin Corie; Sandy Swain; Micky Minhas

(57) ABSTRACT

Various technologies described herein pertain to classifying data in a main memory database system. A record access log can include a sequence of record access observations logged over a time period from a beginning time to an end time. Each of the record access observations can include a respective record ID and read timestamp. The record access log can be scanned in reverse from the end time towards the beginning time. Further, access frequency estimate data for records corresponding to record IDs read from the record access log can be calculated. The access frequency estimate data can include respective upper bounds and respective lower bounds of access frequency estimates for each of the records. Moreover, the records can be classified based on the respective upper bounds and the respective lower bounds of the access frequency estimates, such that K records can be classified as being frequently accessed records.

20 Claims, 10 Drawing Sheets

(56) References Cited

U.S. PATENT DOCUMENTS

| | | | |
|---|---|---|---|
| 2009/0106518 A1* | 4/2009 | Dow | G06F 3/0613 711/165 |
| 2011/0107056 A1* | 5/2011 | Kuo | G06F 12/0246 711/203 |
| 2011/0219169 A1 | 9/2011 | Zhang et al. | |
| 2011/0225347 A1* | 9/2011 | Goss | G06F 12/0246 711/103 |
| 2012/0173831 A1* | 7/2012 | Rubio et al. | 711/165 |
| 2012/0209893 A1* | 8/2012 | Kim et al. | 707/822 |
| 2012/0290598 A1* | 11/2012 | Kihara et al. | 707/758 |
| 2013/0227461 A1* | 8/2013 | Berger et al. | 715/777 |

OTHER PUBLICATIONS

Bansal, et al., "CAR: Clock with Adaptive Replacement", Retrieved at << http://theory.stanford.edu/~sbansal/pubs/fast04.pdf>>, In Proceedings of the 3rd USENIX Conference on File and Storage Technologies, Mar. 2004, pp. 187-200.

Blanas, et al., "Design and Evaluation of Main Memory Hash Join Algorithms for Multi-Core CPUs", Retrieved at <<http://pages.cs.wisc.edu/~jignesh/publ/hashjoin.pdf>>, In Proceedings of the 2011 International Conference on Management of Data, Jun. 12, 2011, pp. 37-48.

Denning, Peter J., "The Working Set Model for Program Behavior", Retrieved at <<http://cs.gmu.edu/cne/pjd/PUBS/WSModel_1968.pdf>>, In Magazine of Communications of the ACM, vol. 11, Issue 5, May 1968, pp. 323-333.

Graefe, Goetz, "The Five-Minute Rule 20 Years Later (and How Flash Memory Changes the Rules)", Retrieved at <<http://delivery.acm.org/10.1145/1540000/1538805/p48-graefe.pdf?ip=203.8.109.15&acc=OPEN&CFID=81481584&CFTOKEN=89904261&_acm_=1336559406_8b6c6419c5a6c37507c3871964608dc4>>, In Magazine of Communications of the ACM—Barbara Liskov: ACM's A.M. Turing Award Winner, vol. 52, Issue 7, Jul. 2009, pp. 48-59.

Gray, et al., "The 5 Minute Rule for Trading Memory for Disk Accesses and the 10 Byte Rule for Trading Memory for CPU Time", Retrieved at <<http://users.informatik.uni-halle.de/~hinnebur/Lehre/2008_db_iib_web/p395-gray-2.pdf>>, In Proceedings of the 1987 ACM SIGMOD International Conference on Management of Data, vol. 16, Issue 3, May 1987, pp. 395-398.

Grund, et al., "HYRISE—A Main Memory Hybrid Storage Engine", Retrieved at <<http://ares.epic.hpi.uni-potsdam.de/apps/static/papers/hyrise_hybrid_engine.pdf>>, In VLDB, Sep. 13, 2010, pp. 1-12.

Ilyas, et al., "A Survey of Top-k Query Processing Techniques in Relational Database Systems", Retrieved at <<http://www.cs.uwaterloo.ca/~ilyas/papers/IlyasTopkSurvey.pdf>>, In ACM Computing Surveys, vol. 40, Issue 4, Oct. 2008, pp. 1-58.

Jiang, et al., "LIRS: An Efficient Low Inter-reference Recency Set Replacement Policy to Improve Buffer Cache Performance", Retrieved at <<http://www.cse.ohio-state.edu/hpcs/WWW/HTML/publications/papers/TR-02-6.pdf>>, In Proceedings of the 2002 ACM SIGMETRICS International Conference on Measurement and Modeling of Computer Systems, Jun. 15, 2002, pp. 31-42.

Johnson, et al., "2Q: A Low Overhead High Performance Buffer Management Replacement Algorithm", Retrieved at <<http://www.vldb.org/conf/1994/P439.PDF>>, In Proceedings of the 20th International Conference on Very Large Data Bases, Sep. 1994, pp. 439-450.

Kallman, et al., "H-Store: A High Performance, Distributed Main Memory Transaction Processing System", Retrieved at <<http://cs-www.cs.yale.edu/homes/dna/papers/hstore-demo.pdf>>, In VLDB, Aug. 24, 2008, pp. 1-4.

Kemper, et al., "Dual-Buffering Strategies in Object Bases", Retrieved at <<http://citeseerx.ist.psu.edu/viewdoc/download?doi=10.1.1.105.9535&rep=rep1&type=pdf>>, In Proceedings of the 20th International Conference on Very Large Data Bases, Sep. 1994, pp. 427-438.

Kim, et al., "Architecture of the ORION Next-Generation Database System", Retrieved at <<http://ieeexplore.ieee.org/stamp/stamp.jsp?arnumber=00050909>>, In Journal of IEEE Transactions on Knowledge and Data Engineering, vol. 2, Issue 1, Mar. 1990, pp. 109-124.

Larson, et al., "High-Performance Concurrency Control Mechanisms for Main-Memory Databases", Retrieved at <<http://vldb.org/pvldb/vol5/p298_per-akelarson_vldb2012.pdf>>, In Proceedings of the 38th International Conference on Very Large Data Bases, vol. 5, Issue 4, 2012, pp. 298-309.

Lee, et al., "LRFU: A Spectrum of Policies that Subsumes the Least Recently Used and Least Frequently Used Policies", Retrieved at <<http://ieeexplore.ieee.org/stamp/stamp.jsp?arnumber=00970573>>, In Proceedings of IEEE Transactions on Computers, vol. 50, Issue 12, Dec. 2001, pp. 1352-1361.

Megiddo, et al., "ARC: A Self-Tuning, Low Overhead Replacement Cache", Retrieved at <<http://static.usenix.org/event/fast03/tech/full_papers/megiddo/megiddo.pdf>>, In Proceedings of the 2nd USENIX Conference on File and Storage Technologies, Mar. 31, 2003, pp. 1-17.

O'Neil, et al., "The LRU-K Page Replacement Algorithm for Database Disk Buffering", Retrieved at <<http://www.cs.cmu.edu/~christos/courses/721-resources/p297-o_neil.pdf>>, In Proceedings of the ACM SIGMOD International Conference on Management of Data, May 1993, pp. 297-306.

O'Neil, et al., "An Optimality Proof of the LRU-K Page Replacement Algorithm", Retrieved at <<https://domino.mpi-inf.mpg.de/intranet/ag5/ag5publ.nsf/db686c64d01079eac125614500594fe7/20c00b6ff1e4f2b8c125714d0057b83b/$FILE/ONeilOW99.pdf>>, In Journal of the ACM, vol. 46, No. 1, Jan. 1999, pp. 92-112.

Pandis, et al., "PLP: Page Latch-free Shared-everything OLTP", Retrieved at <<http://www.vldb.org/pvldb/vol4/p610-pandis.pdf>>, In Journal Proceedings of the VLDB Endowment, vol. 4, Issue 10, Aug. 29, 2011, pp. 610-621.

Sewall, et al., "PALM: Parallel Architecture-Friendly Latch-Free Modifications to B+ Trees on Many-Core Processors", Retrieved at <<http://www.cs.utexas.edu/users/ckkim/papers/palm_vldb11.pdf>>, In Proceedings of Very Large Data Bases Endowment, Aug. 2011, pp. 795-806.

Stonebraker, et al., "The End of an Architectural Era (Its Time for a Complete Rewrite)", Retrieved at <<http://citeseerx.ist.psu.edu/viewdoc/download?doi=10.1.1.137.3697&rep=rep1&type=pdf>>, In Proceedings of the 33rd International Conference on Very Large Data Bases, Sep. 23, 2007, pp. 1150-1160.

Zhou, et al., "The Multi-Queue Replacement Algorithm for Second Level Buffer Caches", Retrieved at <<http://static.usenix.org/event/usenix01/full_papers/zhou/zhou.pdf>>, In Proceedings of the 2001 USENIX Annual Technical Conference, Jun. 25, 2001, pp. 91-104.

* cited by examiner

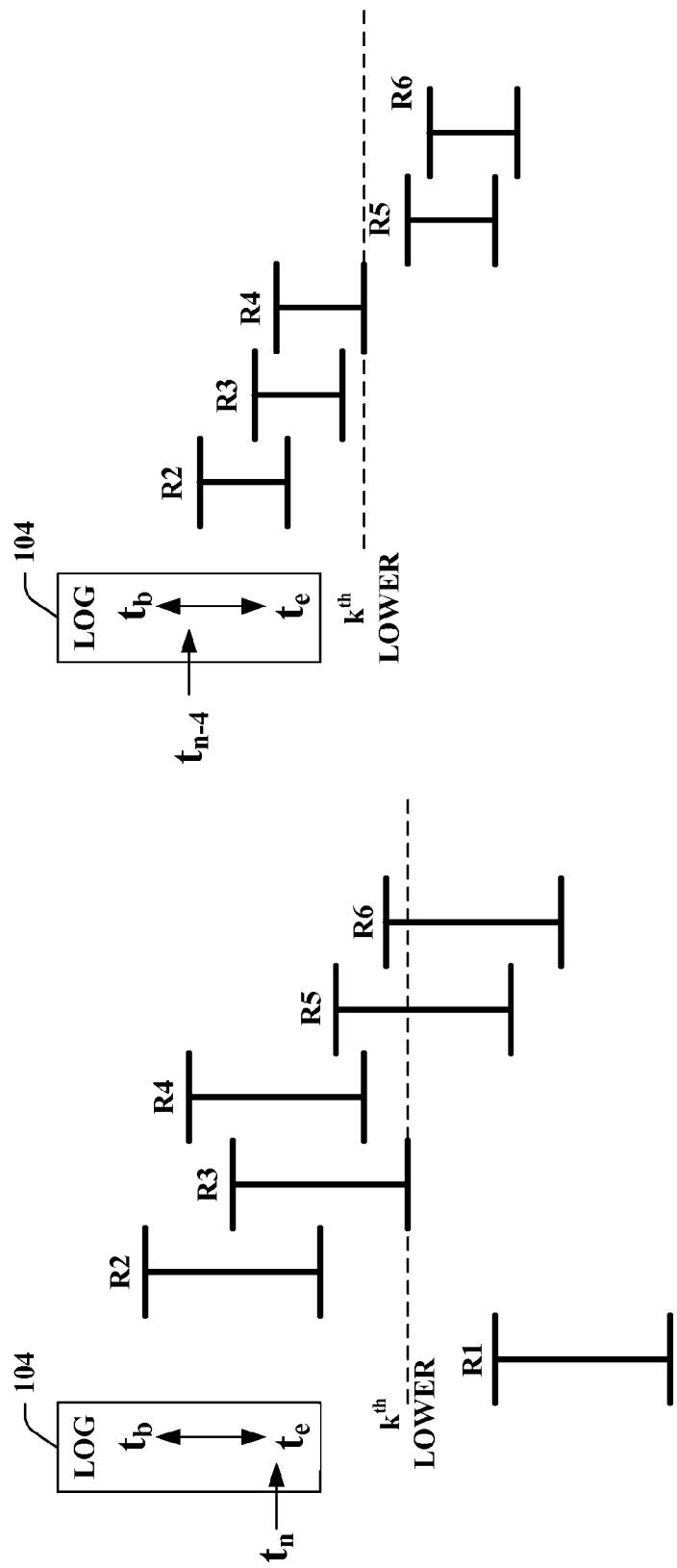

CLASSIFICATION OF DATA IN MAIN MEMORY DATABASE SYSTEMS

BACKGROUND

Traditional database management systems were designed with data being disk resident (e.g., store data on secondary storage); accordingly, in these systems, data is paged in and out of memory as needed. More recently there has been a shift in design of database management systems, such as online transaction processing (OLTP) databases, attributable at least in part to decreases in memory costs. Accordingly, several database management systems (e.g., main memory database systems) have emerged that primarily rely on memory for data storage (e.g., most or all of the data may be stored in memory as opposed to secondary storage).

In a transactional workload, frequencies of record accesses tend to be skewed. Some records are "hot" and accessed frequently (e.g., these records can be considered to be included in a working set), others records are "cold" and accessed infrequently, if ever, while "lukewarm" records lie somewhere in between. Performance of database engines can depend on the hot (and lukewarm) records residing in memory. Moreover, with current designs of main memory database systems, hot, lukewarm, and cold records oftentimes remain in memory.

SUMMARY

Described herein are various technologies that pertain to classifying data in a main memory database system. A record access log can include a sequence of record access observations logged over a time period from a beginning time to an end time. Each of the record access observations can include a respective record ID and read timestamp. The record access log can be scanned in reverse from the end time towards the beginning time. Further, access frequency estimate data for records corresponding to record IDs read from the record access log can be calculated. The access frequency estimate data can include respective upper bounds and respective lower bounds of access frequency estimates for each of the records. Moreover, the records can be classified based on the respective upper bounds and the respective lower bounds of the access frequency estimates, such that K records can be classified as being frequently accessed records.

According to various embodiments, the access frequency estimates can be based on a weighted average with decreasing weights over time. An example of a weighted average with decreasing weights over time is exponential smoothing.

Various algorithms can be utilized to classify the data in the main memory database system. For example, a backward algorithm can be employed to classify the records; thus, the record access log can be scanned in reverse and the access frequency estimate data can be calculated based upon record access observations thus read from the record access log. In accordance with another example, a parallel backward algorithm can be utilized to classify the records; accordingly, in parallel, worker threads can scan record access log partitions in reverse and calculate access frequency estimate data based upon respective record access observations read from each of the record access log partitions. Following this example, a controller can control the worker threads, obtain access frequency estimate data from the worker threads, and identify the K records having highest access frequency estimates.

The access frequency estimate data for the records can be retained in a table. In accordance with various embodiments, access frequency estimate data for a subset of the records can be removed when such records fall out of contention for being classified in a hot set. Moreover, according to various embodiments, an accept threshold that represents a time slice in the record access log can be determined, and previously unseen records read during scanning at or beyond the accept threshold can be discarded.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 4-5 illustrate an exemplary backward classification of records performed by a system depicted in FIG. 3.

DETAILED DESCRIPTION

Figure 1:
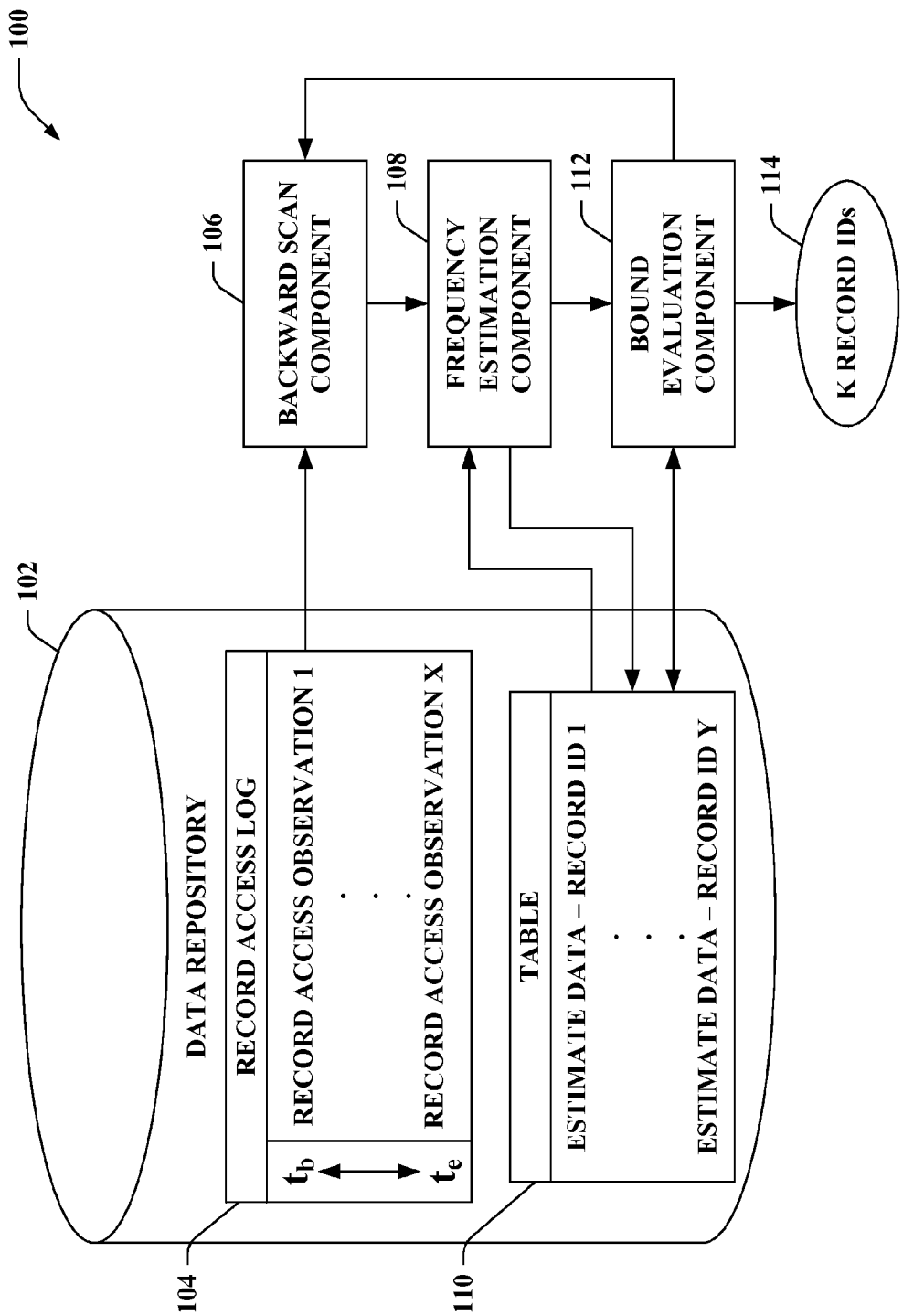
FIG. 1 illustrates a functional block diagram of an exemplary system that classifies data in a main memory database system.

Various technologies pertaining to classifying data in a main memory database system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Main memories are becoming sufficiently large such that databases (e.g., online transaction processing (OLTP) databases) oftentimes can be stored in main memory. However, database workloads typically exhibit skewed access patterns, where some records of the database are frequently accessed while other records are infrequently, if ever, accessed. Accordingly, although possible to store infrequently accessed records in main memory, cost savings and performance enhancements may result if such records are stored in secondary storage. Thus, it may be beneficial to migrate infrequently accessed records out of main memory to secondary storage. For instance, as a size of a database (e.g., OLTP database) increases, the working set may fit in memory, while the memory may be unable to store records outside of the working set (or a portion of such records outside of the working set). According to another example, retaining infrequently accessed records in memory may degrade system performance (e.g., resulting in a performance penalty). As an illustration of this example, a lookup in a hash index may have to wade through many infrequently accessed records on the path to a frequently accessed record, causing the database engine to waste cycles on inspecting the infrequently accessed records. By way of yet another example, although the cost of memory may be decreasing, the cost of secondary storage may still be comparatively less expensive (e.g., it may be more economical to store infrequently accessed records in secondary storage).

As set forth herein, access frequency of data in a main memory database system can be evaluated. Accesses of records included in the database can be logged (e.g., possibly sampled and logged), and offline analysis can be performed to estimate record access frequencies based on the logged accesses. Various backward algorithms can be utilized to calculate the record access frequency estimates. The backward algorithms can be based on a weighted average with decreasing weights over time; an example of such a weighted average with decreasing weights over time is exponential smoothing. The backward algorithms can create upper and lower bounds of the record access frequency estimates. Further, classification of the records can be performed based on the upper and lower bounds of the record access frequency estimates (e.g., rank order records based on the upper and lower bounds of the estimates and classify the records based on the order, etc.).

Referring now to the drawings, FIG. 1 illustrates a system 100 that classifies data in a main memory database system. The system 100 evaluates which records in the main memory database system are "hot" or "cold." A "hot" record is a record that is frequently accessed and a "cold" record is a record that is infrequently accessed, for example. An input used by the system 100 to classify the records is a sequence of record access observations (e.g., record identifiers (IDs) and access timestamps) over a period of time. Also, a parameter K signifying a number of records to classify as "hot" can be another input to the system 100, where K can be substantially any integer. The system 100 can estimate a respective access frequency of at least a subset of the records (e.g., estimation of access frequencies of some infrequently accessed records may be skipped). Moreover, the K records with the highest access frequencies are classified as hot records (these K records are also referred to as a "hot set"), while the remaining records are classified as cold records. According to an example, hot records (e.g., the K records) can be stored in main memory, while the cold records (e.g., the remaining records) may be candidates to migrate to secondary storage (e.g., cold storage). The value of K can be determined by various metrics. Examples of such metrics include working set size or available memory. Further, it is assumed that once data moves to secondary storage, it is still available to a database engine, albeit at increased access costs.

The system 100 includes a data repository 102 that retains a record access log 104. The record access log 104 includes the sequence of record access observations. For instance, the record access log 104 can include X record access observations, where X is substantially any integer (e.g., record access observation 1, . . . , record access observation X). Moreover, the sequence of record access observations is ordered from a beginning time period $t_b$ to an end time period $t_e$.

More particularly, in the record access log 104, a record access observation (e.g., one of the X record access observations) can be an ID of a record (e.g., a record ID) associated with a corresponding discrete time slice (e.g., discrete time period) during which such record was observed to have been accessed. Thus, each record access can be associated with a discrete time slice, denoted $[t_n, t_{n+1}]$. Moreover, a subsequent time slice begins at $t_{n+1}$ and ends at $t_{n+2}$, and so on. Time can be measured by record accesses, that is, a clock can "tick" on each record access. As set forth herein, a time slice is identified using its beginning timestamp (e.g., $t_n$ represents time slice $[t_n, t_{n+1}]$, etc.). Since a time slice represents a discrete period when a record access was observed, conceptually the record access log 104 can be considered to store (record ID, time slice) pairs. Physically, the record access log 104 can store a list of record IDs in access order delineated by time markers that represent time slice boundaries.

Moreover, the system 100 includes a backward scan component 106 that scans the record access log 104 in reverse from the end time $t_e$ towards the beginning time $t_b$. Accordingly, the backward scan component 106 can read records IDs in the record access log 104 starting from the end of the list (e.g., beginning with record access observation X, then record access observation X−1, and so forth) and proceeding towards the beginning of the list. By scanning the record access log 104 in reverse, it may be possible to read less than all of the record IDs (e.g., less than X record access observations); however, if needed, all of the record IDs in the record access log 104 may be read.

The system 100 further includes a frequency estimation component 108 that calculates access frequency estimate data for records read by the backward scan component 106. The frequency estimation component 108 can store the access frequency estimate data in a table 110. Further, the frequency estimation component 108 can retrieve and update the access frequency estimate data retained in the table 110 (e.g., as record IDs in the record access log 104 are read by the backward scan component 106).

In the depicted example, the table 110 includes access frequency estimate data for Y records (e.g., corresponding to Y record IDs), where Y is substantially any integer equal to or less than the number of records in the main memory database system; yet, it is to be appreciated that number of records for which access frequency estimate data is stored in the table 110 can be increased (e.g., as a previously unseen record is read by the backward scan component 106) or decreased (e.g., pruning access frequency estimate data for records detected to not be in the hot set) during classification of the records. Further, the table 110 can be retained in the data repository 102; however, it is to be appreciated that the claimed subject matter is not so limited. The access frequency estimate data for a particular record read by the backward scan component 106 includes a respective upper bound of an access frequency estimate and a respective lower bound of the access frequency estimate for such particular record. For example, a record associated with record ID 1 in the table 110 can have an upper bound and a lower bound of an access frequency estimate; the upper bound and the lower bound provide a range within which the access frequency estimate for such record is bound.

The system 100 also includes a bound evaluation component 112 that classifies the records based on upper bounds and lower bounds of access frequency estimates in the table 110. For instance, the bound evaluation component 112 can determine whether the K records with the K highest access frequency estimates are distinguishable as a function of the upper bounds and the lower bounds of the access frequency estimates. If the K records with the K highest access frequency estimates are distinguishable, then K record IDs 114 corresponding to the K records with the K highest access frequency estimates can be outputted. Alternatively, so long as the bound evaluation component 112 is unable to distinguish the K records with the K highest access frequency estimates from the upper bounds and the lower bounds of the access frequency estimates, the backward scan component 106 can continue reading record IDs from the record access log 104 and the frequency estimation component 108 can calculate, add, update, purge, etc. access frequency estimate data in the table 110 (e.g., causing upper and lower bounds on access frequency estimates to converge).

The bound evaluation component 112 can identify a $k^{th}$ lower bound in the table 110 based on the value of K. Moreover, the bound evaluation component 112 can determine a number of upper bounds in the table 110 that are greater than the $k^{th}$ lower bound. The bound evaluation component 112 can cause the backward scan component 106 to continue reading the record access log 104 in reverse when the number of upper bounds determined to be greater than the $k^{th}$ lower bound is more than K; otherwise, the bound evaluation component 112 can discontinue the scan and output the K record IDs 114. When the bound evaluation component 112 causes the backward scan component 106 to continue reading the record access log 104 in reverse, the frequency estimation component 108 can successively refine the respective upper bounds of the access frequency estimates and the respective lower bounds of the access frequency estimates.

According to an example, the upper bounds of the access frequency estimates and the lower bounds of the access frequency estimates calculated by the frequency estimation component 108 can be upper and lower limits of the access frequency estimates, where the access frequency estimates are based on a weighted average with decreasing weights over time. An example a weighted average with decreasing weights over time is exponential smoothing. With exponential smoothing, an access frequency estimate for a record r at a current time slice $est_r(t_n)$ is calculated as follows:

$$est_r(t_n) = \alpha * x_{t_n} + (1-\alpha) est_r(t_{n-1}) \quad (1)$$

In the foregoing, $t_n$ represents a current time slice, and $x_{t_n}$ represents an observation value at time $t_n$. According to an example, $x_{t_n}$ is 1 if an access for record r was observed during $t_n$, and 0 otherwise. Meanwhile, $est_r(t_{n-1})$ is an estimate from a previous time slice $t_{n-1}$. The variable $\alpha$ is a decay factor that determines a weight to give to new observations and how quickly to decay old estimates.

Exponential smoothing can be employed due to its simplicity and accuracy. The accuracy of an estimator can be measured by its standard error, that is, a standard deviation of a probability distribution of an estimated quantity. For a record with true access frequency p, a standard error for exponential smoothing may be $\sqrt{\alpha p(1-p)/(2-\alpha)}$. Misclassification of a record (e.g., improperly classifying a hot record as being cold) may lead to degradation of system performance (e.g., due to a hot record being migrated to secondary storage); accordingly, use of exponential smoothing can mitigate such misclassification. However, it is to be appreciated that the claimed subject matter is not limited to use of exponential smoothing; rather, any weighted average with decreasing weights over time is intended to fall within the scope of the hereto appended claims.

Figure 2:
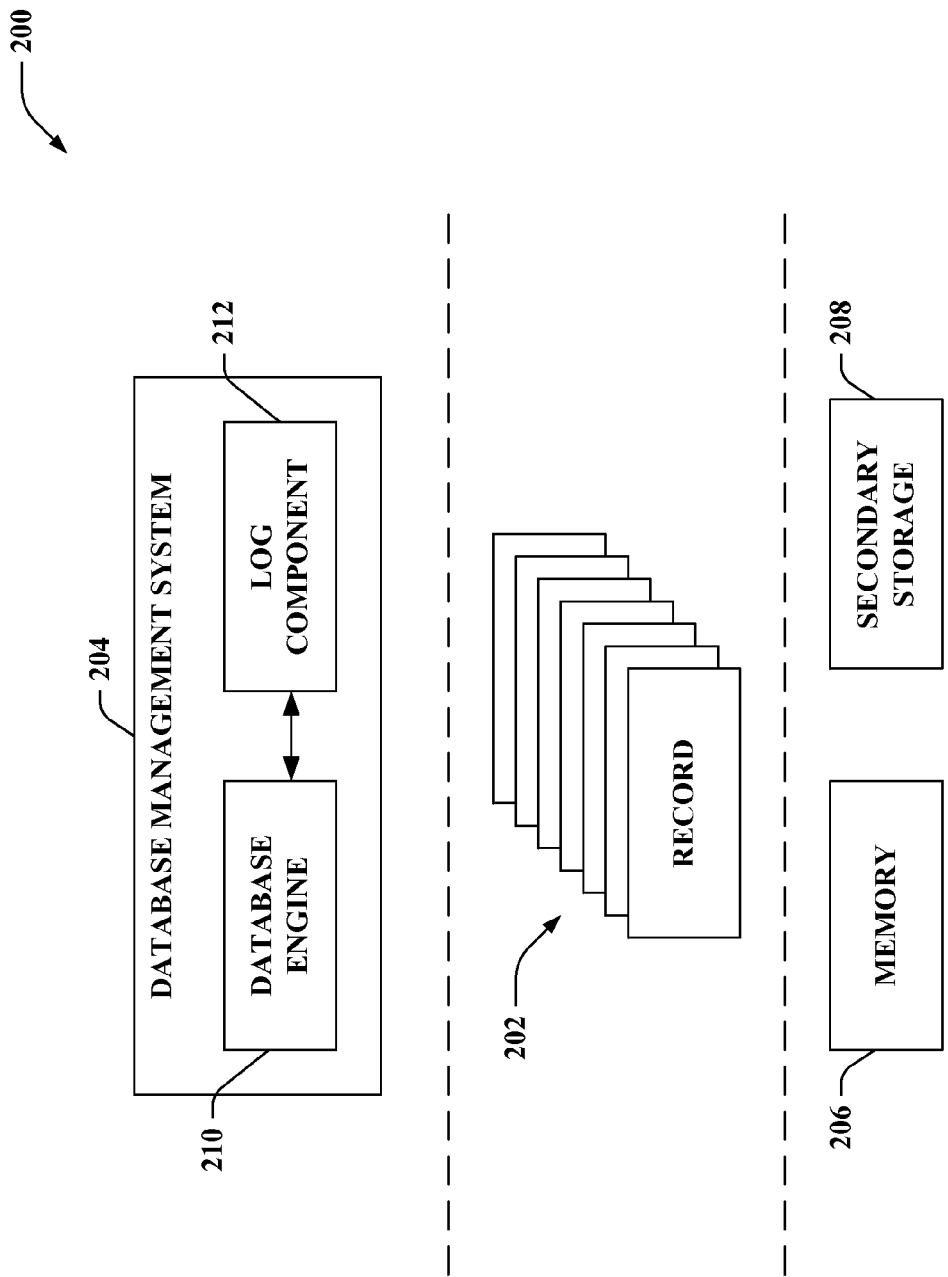
FIG. 2 illustrates a functional block diagram of an exemplary system that logs accesses of records during database runtime.

With reference to FIG. 2, illustrated is a system 200 that logs accesses of records 202 during database runtime. The system 200 includes a database management system 204 that controls creation, maintenance, and use of a database, where the database includes the records 202. The database, for instance, can be an online transaction processing (OLTP) database; yet, it is to be appreciated that the claimed subject matter is not so limited. The database management system 204 can be a main memory database system, for example; thus, the records 202 (or a subset thereof) may be stored in memory 206 (e.g., the main memory database system can rely on the memory 206 for data storage). According to an example, a portion of the records 202 may be stored in secondary storage 208 (e.g., infrequently accessed records can be migrated to the secondary storage 208); however, the claimed subject matter is not so limited.

The database management system 204 further includes a database engine 210. The database engine 210 creates, reads, updates, and deletes the records 202 from the database. Pursuant to an example, the database engine 210 can be a main memory optimized engine that may migrate some of the records 202 identified as being cold to the secondary storage 208.

Moreover, the database management system 204 includes a log component 212 that logs accesses of the records 202 by the database engine 210. The log component 212 logs the accesses of the records 202 during system runtime. Although not shown, it is to be appreciated that the log component 212 can log the record accesses in the record access log 104. Thus, from the beginning time $t_b$ to the end time $t_e$, the log component 212 can log the sequence of X record access observations in the record access log 104.

The log component 212 logs the accesses of the records 202 for offline analysis. Accordingly, the log component 212 writes record access data to the record access log 104 (separate from a transactional log) for later offline analysis of access frequencies. In contrast, some conventional approaches for estimating access frequencies employ an inline approach, where estimates of access frequencies or rank orders for records are maintained in memory and updated on every record access. For instance, caching policies such as Least Recently Used (LRU), LRU-k, Most Recently Used (MRU), Adaptive Replacement Cache (ARC), or the like use an inline approach because eviction decisions are made online.

As noted above, in the offline approach employed by the log component 212, record access data is written to the record access log 104 for later offline analysis. Accordingly, few changes may be made to the database engine 210 to implement the offline approach. Further, the logging performed by the log component 212 may impose limited overhead, in space and time, during operation of the database management system 204 (e.g., mitigating impact on latency and throughput of the database management system 204). Moreover, use of the offline approach allows flexibility concerning when, where, and how to analyze the record access log 104 and estimate access frequencies (e.g., to classify the records 202). For instance, the analysis can be executed on a separate machine, thus reducing overhead on a system running the transactional workloads (e.g., the classification and the transactional workloads can be performed by separate machines or CPU cores).

According to an example, the log component 212 can log every access of the records 202 by the database engine 210. By way of another example, the log component 212 can sample the accesses of the records 202 by the database engine 210. It is to be appreciated that the accesses of the records 202 can be sampled with substantially any sample rate. Sampling of the accesses of the records 202 can reduce system overhead compared to logging every access of the records 202.

Figure 3:
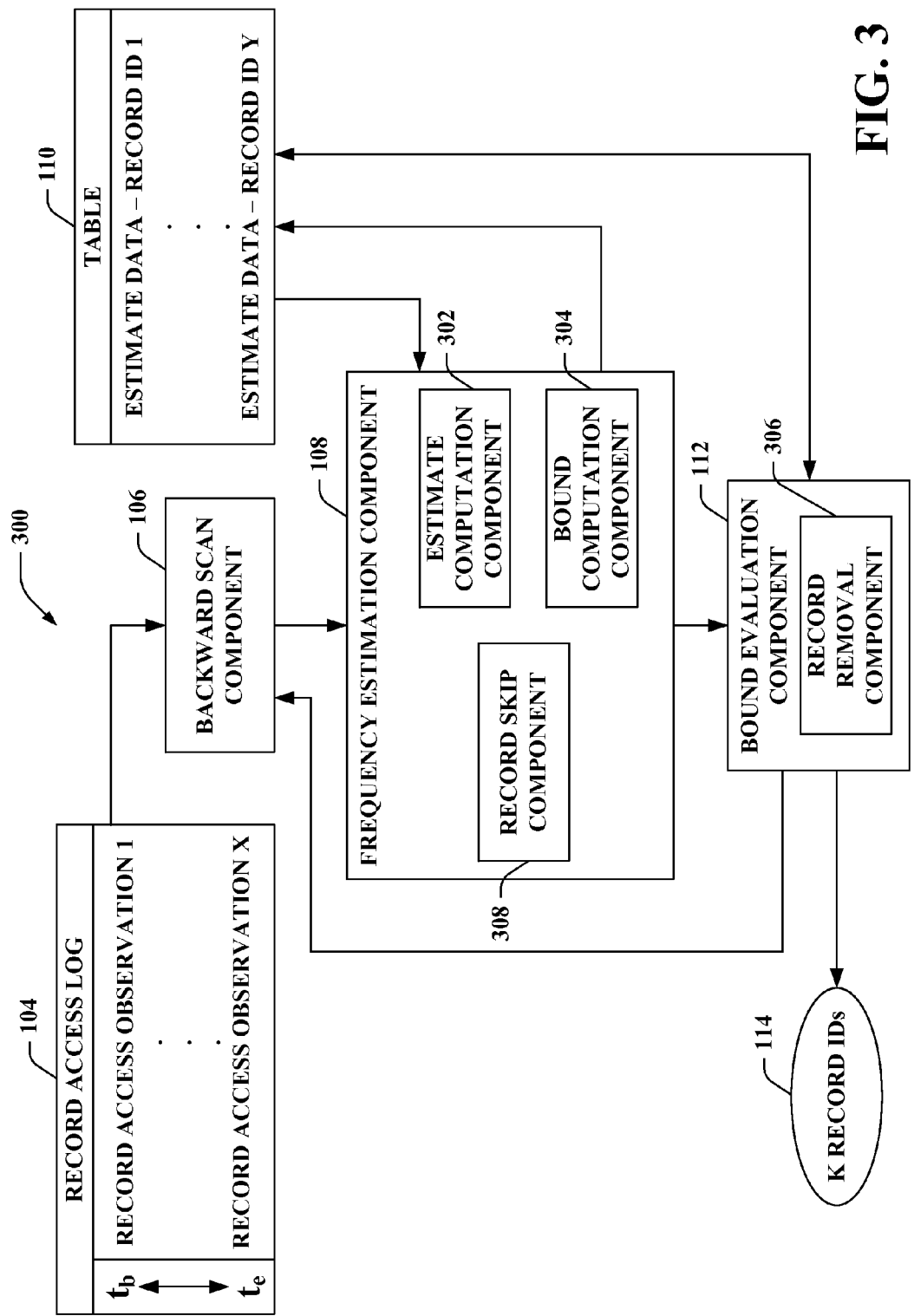
FIG. 3 illustrates a functional block diagram of an exemplary system that employs a backward algorithm to classify data in a main memory database system.

With reference to FIG. 3, illustrated is a system 300 that employs a backward algorithm to classify data in a main memory database system. The system 300 can efficiently classify records as hot or cold, for instance. Similar to above, the input to the system 300 can be the record access log 104 (also referred to herein as log L) that stores the X record access observations and the parameter K that signifies a number of records to classify as "hot." The system 300 utilizes exponential smoothing to estimate record access frequency, and reports the "hot" records as the K record IDs 114 corresponding to the K records with the highest estimates access frequencies. Accordingly, a remainder of the records can receive a "cold" classification.

If possible, it may be desirable to avoid scanning the entire record access log 104 when determining the K record IDs 114. Accordingly, the system 300 employs the backward algorithm to attempt to determine the K record IDs 114 while scanning a subset of the record IDs (e.g., a subset of the X record access observations) in the record access log 104. In contrast, the entire record access log 104 is typically scanned if a forward algorithm that scans the record access log 104 from beginning to end (as described below) is employed.

As noted above, the backward scan component 106 can scan the record access log 104 in reverse. Further, the frequency estimation component 108 can derive respective upper bounds and respective lower bounds for the access frequency estimates for the records encountered by the backward scan component 106. Thus, an estimate of the access frequency for each record can be represented as a continuous range (e.g., the continuous range being based on an upper bound and a lower bound of an estimate of the access frequency for a given record). Occasionally, the bound evaluation component 112 can attempt to perform classification using these upper bound and lower bound values and terminate the scan of the record access log 104.

The frequency estimation component 108 can include an estimate computation component 302 and a bound computation component 304. While the backward scan component 106 reads the record access log 104 in reverse, an access to a record r at time slice $t_n$ can be encountered (e.g., a record ID corresponding to the record r can be read in the record access log 104). The estimate computation component 302 can incrementally update a running backward estimate estb for the record r retained in the table 110 according to the following:

$$estb_r(t_n) = \alpha(1-\alpha)^{(t_e-t_n)} - estb_r(t_{last}) \quad (2)$$

In the above, $estb_r(t_{last})$ represents the backward estimate calculated when the record r was last encountered in the record access log 104 at time slice $t_{last}$ (where $t_{last} > t_n$ since the backward scan component 106 scans in reverse). Using the backward estimate, the bound computation component 304 can compute an upper bound for an actual estimate value of the record r at the time slice $t_n$ as follows:

$$upEst_r(t_n) = estb_r(t_n) + (1-\alpha)^{t_e-t_n+1} \quad (3)$$

In this equation, $t_e$ represents the end time slice in the record access log 104. The value produced by this equation represents a largest access frequency estimate value r can have and can be retained in the table 110. Thus, the bound computation component 304 computes the upper bound by assuming that the record r is encountered at every time slice moving backward in the record access log 104 from the time slice $t_n$. Likewise, the lower bound on the estimate value of the record r can be computed by the bound computation component 304 as follows:

$$loEst_r(t_n) = estb_r(t_n) + (1-\alpha)^{t_e-tb+1} \quad (4)$$

This lower bound represents a lowest access frequency estimate value r can have and can be retained in the table 110. The bound computation component 304 computes the lower bound by assuming that the record r is not encounter again while scanning backward in the record access log 104 from the time slice $t_n$. As the backward scan component 106 continues scanning the record access log 104 in reverse and processing more record accesses, ranges between respective upper and lower bounds calculated by the bound computation component 304 for the corresponding records converges. With the backward approach, however, is may be possible to perform a classification of the records without a complete scan of the record access log 104. The bound evaluation component 112 can compare ranges between upper and lower bounds for records to detect the K record IDs 114. Hence, the bound evaluation component 112 can preempt the backward scanning by the backward scan component 106 at some point and provide a classification using the (inexact) bound values.

Moreover, the bound evaluation component 112 can include a record removal component 306 that can remove records from the table 110 that fall out of contention for possibly being in the hot set. Removal of such records that are not in contention can reduce space overhead as compared to the forward algorithm set forth below. According to an example, based on the estimate data in the table 110 (e.g., the upper and lower bounds) and the value of the parameter K, the bound evaluation component 112 can detect a value of a $k^{th}$ lower bound. Following this example, the record remove component 306 can remove records from the table 110 that have an upper bound that is lower than the value of the $k^{th}$ lower bound (e.g., since such records are no longer in contention for being in the hot set).

Further, the frequency estimation component 108 can include a record skip component 308 that determines a place in the record access log 104 beyond which previously unseen records may be skipped. The record skip component 308 can translate the value of the $k^{th}$ lower bound to a time slice in the record access log 104 referred to as an "accept threshold." The accept threshold represents the time slice in the record access log 104 where a new record ID observed at or beyond such threshold can be discarded by the record skip component 308 since such record will have an upper bound less than the $k^{th}$ lower bound (e.g., not in contention for being in the hot set). The accept threshold is computed as follows:

$$t_e - \lfloor \log_{(1-\alpha)} kth\text{LowerBound} \rfloor \quad (5)$$

In the foregoing, $t_e$ is the end time slice of the record access log 104. Since the accept threshold allows the record skip component 308 to disregard records that will not be in the hot set, space overhead (e.g., size of the table 110) can be reduced.

Turning to FIGS. 4-5, illustrated is an exemplary backward classification of records performed by the system 300 of FIG. 3. It is to be appreciated that the backward classification of FIGS. 4-5 is presented for illustration purposes, and the claimed subject matter is not limited to such example.

As shown in FIG. 4, upper and lower bounds for six records (e.g., $R_1$ through $R_6$) can be computed by the bound computation component 304 after scanning the record access log 104 back to time slice $t_n$ (e.g., by the backward scan component 106). In the depicted example, the parameter K, which signifies a number of records to classify as "hot," is set as 3. Based upon the parameter K and the upper and lower bounds for the records, the bound evaluation component 112 can identify a value of the $k^{th}$ lower bound; thus, the lower bound of record $R_3$ can be recognized as the $k^{th}$ lower bound (e.g., the $3^{rd}$ lower bound) in the illustrated example. Based on the lower bound of record $R_3$ corresponding to time slice $t_n$, the bound evaluation component 112 can determine that five records (e.g., $R_2$ through $R_6$) are in contention to be in the hot set since their upper bounds lie above the $k^{th}$ lower bound defined by record $R_3$. Since more than three records are still in contention to be in the hot set, the record access log 104 can continue to be scanned in reverse (e.g., the bound evaluation component 112 can cause the backward scan component 106 to continue to read the record access log 104), thereby allowing for further refinement of the upper and lower bounds (e.g., converging ranges between the upper and lower bounds). Moreover, according to an example, since the upper bound of record $R_1$ is below the $k^{th}$ lower bound defined by record $R_3$, record $R_1$ can be removed from the table 110 by the record removal component 306.

FIG. 5 depicts the exemplary backward classification after the backward scan component 106 reads back four time slices in the record access log 104 (e.g., to time slice $t_{n-4}$) from the time slice used in FIG. 4. The bound computation component 304 can compute upper and lower bounds for the records. As illustrated, ranges between the upper and lower bounds have converged, leading to less overlap between records. Moreover, the bound evaluation component 112 can identify that the $k^{th}$ lower bound is defined by record $R_4$, and that three records are in contention for the hot set ($R_2$, $R_3$, and $R_4$). At this point, the bound evaluation component 112 can cause the backward scan component 106 to stop scanning the record access log 104. Moreover, the bound evaluation component 112 can report a hot set classification (e.g., the K record IDs 114 corresponding to $R_2$, $R_3$, and $R_4$), since no other records have upper bounds that cross the $k^{th}$ threshold. Thus, by employing the backward algorithm, it may be possible for scanning of the record access log 104 to terminate prior to reading all record access observations included therein.

Again, reference is made to FIG. 3. The following pseudocode provides an example of the backward algorithm for record classification that can be utilized by the system 300; yet, it is to be appreciated that the claimed subject matter is not so limited.

---

Algorithm 1 Backward algorithm

---

1: Function BackwardClassify(AccessLog L, HotDataSize K)
2: Hash Table H ← F initialize hash table
3: Read back in L to fill H with K unique records with calculated bounds
4: kthLower ← RecStats r ∈ H with smallest r.loEst value
5: acceptThresh ← $\lfloor t_e - \log_{(1-\alpha)}$ kthLower$\rfloor$
6: while not at beginning of L do
7:   rid ← read next record id from L in reverse
8:   RecStats r ← H.get(rid)
9:   if r if null then
10:     /*disregard new record IDs read after acceptThresh time slice*/
11:     if L.curTime < acceptThresh then goto line 6
12:     else initialize new r
13:   end if
14:   update r.estb, r.upEst, and r.loEst using Equations 2, 3, and 4
15:   H.put(rid,r)
16:   /*begin filter step - inactivate all records that cannot be in hot set*/
17:   if end of time slice has been reached then
18:     ∀r ∈ H update r.estb, r.upEst, and r.loEst as of L.curTime
19:     kthLower ← find value of $k^{th}$ lower bound value in H
20:     ∀r ∈ H with r.upEst ≤ kthLower, remove r from H
21:     if num records ∈ H is K then goto line 25
22:     acceptThresh ← $\lfloor t_e - \log_{(1-\alpha)}$ kthLower$\rfloor$
23:   end if
24: end while
25: return record IDs in H with r.active = true

---

Input for the backward classification function (BackwardClassify) includes the record access log 104 (AccessLog L) and the parameter K (HotDataSize K). At line 2, BackwardClassify creates the table 110 (e.g., a hash table H) to store running estimates for each record that is processed. Table H maps a record ID rid to a data structure RecStats that includes three fields: (a) backEst, a running backward access frequency estimate for a record (Equation 2), (b) loEst, a lower bound of the access frequency estimate for the record (Equation 4), and (c) upEst, an upper bound of the access frequency estimate for the record (Equation 3). The algorithm scans backward in the record access log 104 to fill H with an initial set of K unique records and then finds kthLower, the value of the $k^{th}$ lower bound (Line 4). The value of kthLower is then used to define the accept threshold value acceptThresh (Line 5), defined by Equation 5.

After the initialization phase completes, BackwardClassify scans the record access log 104 in reverse reading the next record ID rid. If rid does not exist in the hash table H and the current time slice (L.curTime) is less than acceptThresh, rid is discarded and the next record from the record access log 104 is read (Line 11). Otherwise, if rid does not exist in the hash table H and the current time slice (L.curTime) is greater than or equal to acceptThresh, then a new RecStats object is initialized for the record (Line 12). Next, the algorithm updates the backward estimate and upper and lower bound values for rid using Equations 2 through 4, respectively, and the RecStats object is put back into the hash table H (Line 14-15).

When BackwardClassify reaches the end of a time slice in the log L, it commences a filter step that attempts to deactivate records that are out of contention for the hot set and terminate early. The filter step begins by adjusting the upper and lower bounds (Equations 2 through 4) of active records in the table H as of the current time slice of the scan defined by L.curTime (Line 18). This step reduces the distance between upper and lower bounds for active records.

Next, the algorithm finds the current $k^{th}$ lower bound value and removes records with upper bounds lower than the new $k^{th}$ lower bound from the hash table H (Lines 19-20). Removing records allows the hash table size to be decreased, thereby improving space overhead and enhancing efficiency of subsequent filter operations (e.g., hash table iteration). If the number of records in H equals K, the algorithm ends and reports the current set of active records as the hot set (Line 21). Otherwise, the filter step ends by calculating a new accept threshold based on the new $k^{th}$ threshold (Line 22). This adjustment moves the accept threshold closer to the current scan point in the log. That is, since the $k^{th}$ threshold is greater than or equal to the last $k^{th}$ threshold, the new accept threshold is greater than or equal to the last accept threshold. In the worst case, the algorithm ends when a scan reaches the beginning of the log. If the scan reaches the beginning of the log, then respective upper bound values and respective lower bound values for records converge to be equal values (e.g., a first upper bound value equals a first lower bound value for a first record, a second upper bound value equals a second lower bound value for a second record, etc.).

In contrast to the backward algorithm set forth above, a forward algorithm can scan the record access log 104 from a beginning time period $t_b$ to an end time period $t_e$ (where $t_b < t_e$). However, if a forward algorithm is employed to calculate access frequency estimates, then the X record access observations in the record access log 104 are scanned to obtain an accurate classification of records.

If employing the forward algorithm, then the record access log 104 is scanned forward from a beginning time slice $t_b$ (e.g., assuming $t_b = 0$) to an end time slice $t_e$. Upon encountering an access to record r at time slice $t_n$, a current access frequency estimate for record r, $est_r(t_n)$, can be updated using the exponential smoothing as follows:

$$est_r(t_n) = \alpha + est_r(t_{prev}) * (1-\alpha)^{(t_n - t_{prev})} \quad (6)$$

In the foregoing, $t_{prev}$ represents the time slice when r was last observed, while $est_r(t_{prev})$ represents the previous estimate for r at that time. In order to update estimates incrementally and avoid updating the estimate for every record at every time slice (as implied by Equation 1), Equation 6 decays the previous estimate using the value $(1-\alpha)^{(t_n - t_{prev})}$. The exponent $(t_n - t_{prev})$ allows the estimate to "catch up" by decaying the previous estimate across time slices when r was not observed in the log (e.g, when the observation $x_{t_n} = 0$ in Equation 1). Once the forward algorithm finishes its scan, it ranks each record by its estimated frequency and returns the K records with highest estimates as the hot set.

The following pseudocode provides an example of the forward algorithm; yet, it is to be appreciated that the claimed subject matter is not so limited.

---

Algorithm 2 Forward algorithm

```
 1:  Function ForwardClassify(AccessLog L, HotDataSize K)
 2:  Hash Table H ← initialize hash table
 3:  while L is not empty do
 4:      rid ← read next record id from L
 5:      RecStats r ← H.get(rid)
 6:      if r is null then initialize r, set r.est ← α +(1 − α)^L.curTime
 7:      else r.est ← α + r.est(1 − α)^(L.curTime-r.prevAccess)
 8:      r.prevAccess ← L.curTime
 9:      H.put(rid,r)
10:  end while
11:  for each r ∈ H do update r.est as of L.curTime
12:  return K record IDs in H with largest estimate values
```

---

The algorithm first initializes a hash table H used to store running estimates (Line 2) and then begins forward scanning of the log (Line 3). Upon encountering a record ID rid, the algorithm uses rid as a key into a hash table that maps to a data structure (referred to as RecStats) that includes (1) est, a running estimate for the record and (2) $t_{prev}$, a time slice when record rid was last encountered. If the rid does not exist in H, a new RecStats entry is created for rid with an initial estimate value of $\alpha + (1-\alpha)^{L.curTime}$, where L.curTime represents the current time slice in the log (Line 6). On the other hand, if rid is present in H, the algorithm updates the record's running estimate using Equation 6 (Line 7). The value $t_{prev}$ is then set to L.curTime and the updated RecStats structure is placed back in the hash table mapped to rid (Lines 8-9). Once the algorithm reaches the end of the log, final estimate values for the records in H are calculated as of L.curTime, which is now the end time slice in the log (Line 11). Thus, this step updates estimates for records not observed in the final time slice of the log. ForwardClassify returns as the hot set the K record IDs with the highest estimate values (Line 12).

As compared to the backward algorithm, the forward algorithm can have various drawbacks. For instance, the forward algorithm can lead to an entire scan of the log in order to calculate final access frequency estimates, while scanning of the log using the backward algorithm can possibly terminate prior to reading all record access observations in the log. Moreover, the forward algorithm can use storage commensurate to the number of unique record IDs in the access log, which can be large; in contrast, the backward algorithm can use less storage (e.g., due to removing records, skipping records, early termination of the backward scan, etc.).

Figure 6:
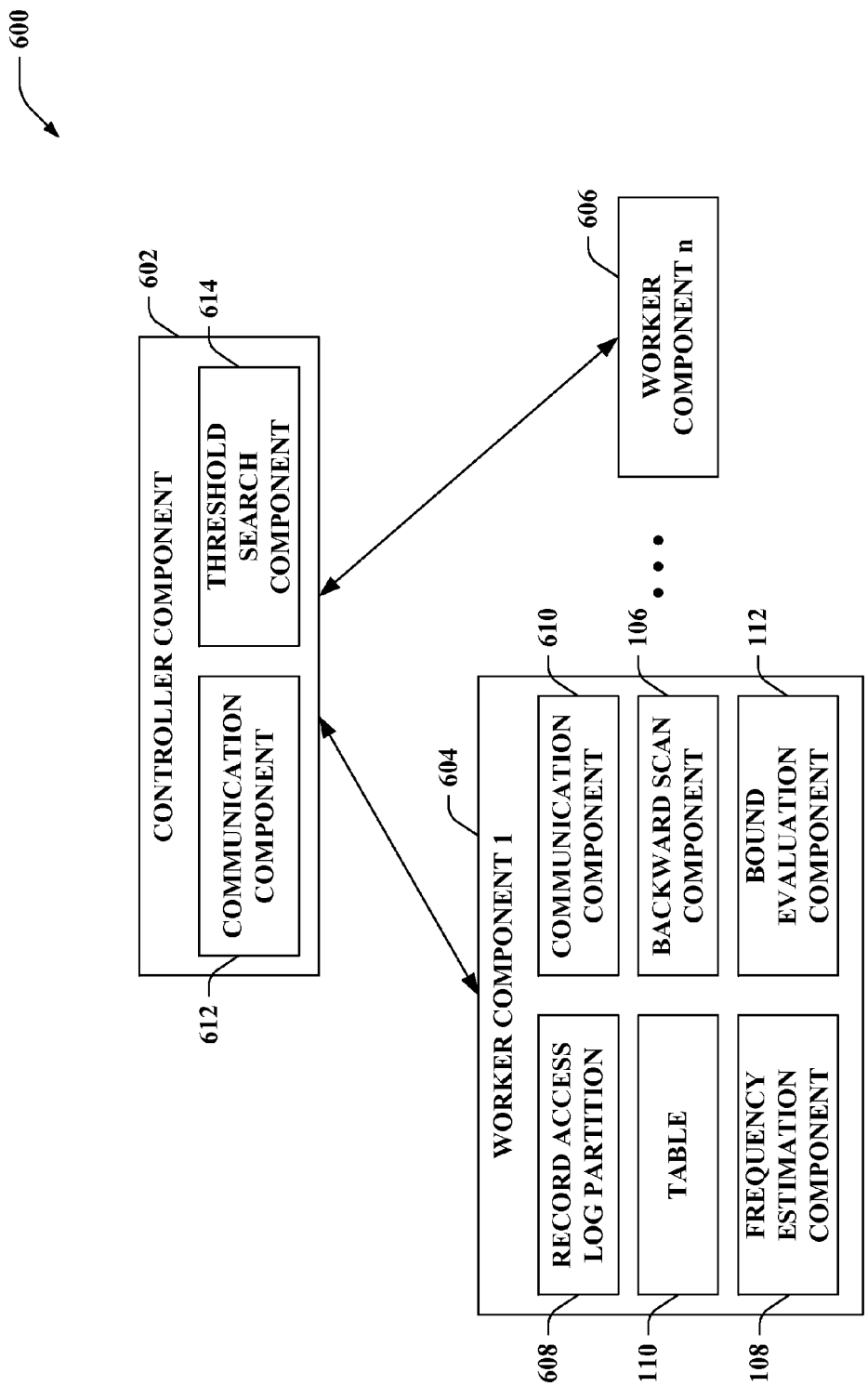
FIG. 6 illustrates a functional block diagram of an exemplary system that utilizes a parallel backward algorithm to classify data in a main memory database system.

Now referring to FIG. 6, illustrated is a system 600 that utilizes a parallel backward algorithm to classify data in a main memory database system. The system 600 includes a controller component 602 and n worker components, namely, a worker component 1 604, . . . , and a worker component n 606 (collectively referred to as worker components 604-606), where n can be substantially any integer. The worker components 604-606 can also be referred to as worker threads. The worker components 604-606 can read respective portions of the record access log 104 in reverse and calculate respective estimate data for records in parallel. Further, the controller component 602 can manage the worker components 604-606 and determine the K record IDs corresponding to the K records with the highest access frequency estimates.

The worker component 1 604 can include the table 110, the backward scan component 106, the frequency estimation component 108, and the bound evaluation component 112. Moreover, the worker component 1 604 can also include a record access log partition 608 and a communication component 610. Although not depicted, it is to be appreciated that each of the worker components 604-606 other than the worker component 1 604 can be substantially similar to the worker component 1 604.

With the parallel backward algorithm, the record access log 104 used for the backward algorithm described above can be divided into n partitions by record ID. For example, the log component 212 of FIG. 2 can create n separate record access log partitions (e.g., the record access log partition 608 of the worker component 1 604, record access log partition(s) of the other n−1 worker component(s)). Following this example, the log component 212 can use a deterministic function on a record ID corresponding to a record (e.g., one of the records 202) to direct a write to an appropriate record access log partition when logging an access during runtime. Thus, a record access observation is written to a particular record access log partition in a deterministic manner as a function of record ID of the record 202 (e.g., accesses associated with the same record ID are written to a common record access log partition). An example of such a deterministic function is a hash function; yet, it is to be appreciated that the claimed subject matter is not so limited.

Moreover, the controller component 602 includes a communication component 612 and a threshold search component 614. The communication component 612 of the controller component 602 can communicate with the communication components of the worker components 604-606 to manage the worker components 604-606, where each of the worker components 604-606 is associated with a corresponding record access log partition. The communication component 612 can use the worker components 604-606 to perform a distributed search for records in a hot set. The worker components 604-606 can scan backward in their respective record access log partitions (e.g., the backward scan component 106 of the worker component 1 604 can read backward in the record access log partition 608) and maintain backward estimates, upper bounds, and lower bounds using Equations 2 through 4 similar to the serial backward algorithm (e.g., the backward estimates, upper bounds, and lower bounds can be computed by the frequency estimation component 108 and retained in the table 110 for the worker component 1 604).

The threshold search component 614 of the controller component 602 can issue commands that can be sent by the communication component 612 to the worker components 604-606 (e.g., to the communication component 610 of the worker component 1 604). For example, the threshold search component 614 can issue an initialization command to the worker components 604-606. By way of another example, the threshold search component 614 can issue a command that requests upper and lower bound counts around a given threshold, where the given threshold is selected by the threshold search component 614. Further, the threshold search component 614 can issue a command that controls how far the worker components 604-606 read back in the respective record access log partitions.

The following pseudocode provides an example of the parallel backward algorithm for record classification that can be utilized by the controller component 602 and the worker components 604-606 in the system 600. As set forth below, the algorithm includes three phases, namely, initialization, threshold search, and finalization. Yet, it is to be appreciated that the claimed subject matter is not limited to the following example pseudocode.

---
Algorithm 3 Backward parallel classification
---
1: Function BwdParController(HotDataSize K, NumParts n)
2: /*Phase I: Initialization */
3:    Request from each worker (1) knld: lower bound of $\frac{K^{th}}{n}$ record,
   (2) up: number records with upper bounds above knlb, (3) low: number records with lower bound above knlb.
4: /* Phase II: Threshold search */
5: Q ← median knlb reported from Phase 1
6: tlow ← total low count from all workers
7: tup ← total up count from all workers
8: if tlow < K then decrease Q
9: else increase Q ---
Algorithm 3 Backward parallel classification
---
10: issue ReportCounts(Q) command to workers, get new tlow and tup values
11: if |tup − tlow| > 0 then issue TightenBounds command to workers
12: repeat steps 8-11 until tlow = K and |tup − tlow| = 0
13: /* Phase III: Finalization */
14: List S ← record IDs from all workers with upper bound estimates above Q
15: return S
16:
17: Function BwdParWorker(LogPartition L, ControllerCommand C)
18: if C = Initialization then
19:    read back in L far enough to find knlb, low, and up
20:    return knlb, lower, and upper to controller
21: else if C = ReportCounts(Q) then
22:    perform new counts for low and up given Q
23:    return new low and up values to controller
24: else if C = TightenBounds then
25:    read back in L to tighten upper and lower bounds for all records
26: else if C = Finalize(Q) then
27:    return record IDs with upper bounds above Q to controller
28: end if In the initialization phase (Line 3), the controller component 602 can send a request to the worker components 604-606 that causes each of the worker components 604-606 to report back to the controller component 602 an initial set of statistics pertaining to records included in each of the record access log partitions of the worker components 604-606. For instance, oftentimes the record access log partitions of each of the worker components 604-606 may hold more or less than $$\frac{K}{n}$$

records that contribute to the hot set. Since the controller component 602 lacks a priori information about the records in the each of the record access log partitions, the controller component 602 requests that each worker component 604-606 read back in their respective record access log partitions far enough to find (a) knth, a lower-bound estimate of the partition's $$\frac{K^{th}}{n}$$

hottest record, (b) low, a count of a number of records that have lower bounds above or equal to knth, and (c) up, a count of the number of records with upper bounds above knth. To report accurate counts, each of the worker components 604-606 reads back far enough to a time where records that can possibly have upper bound estimates greater than the knth threshold have been considered. This time can be determined by translating the value knth to a time slice t in the record access log partition using Equation 5 (the equation used to define the accept threshold in the serial backward classification algorithm). It is noted that records read before reaching t have upper bounds above knth during the initialization phase.

Figure 7:
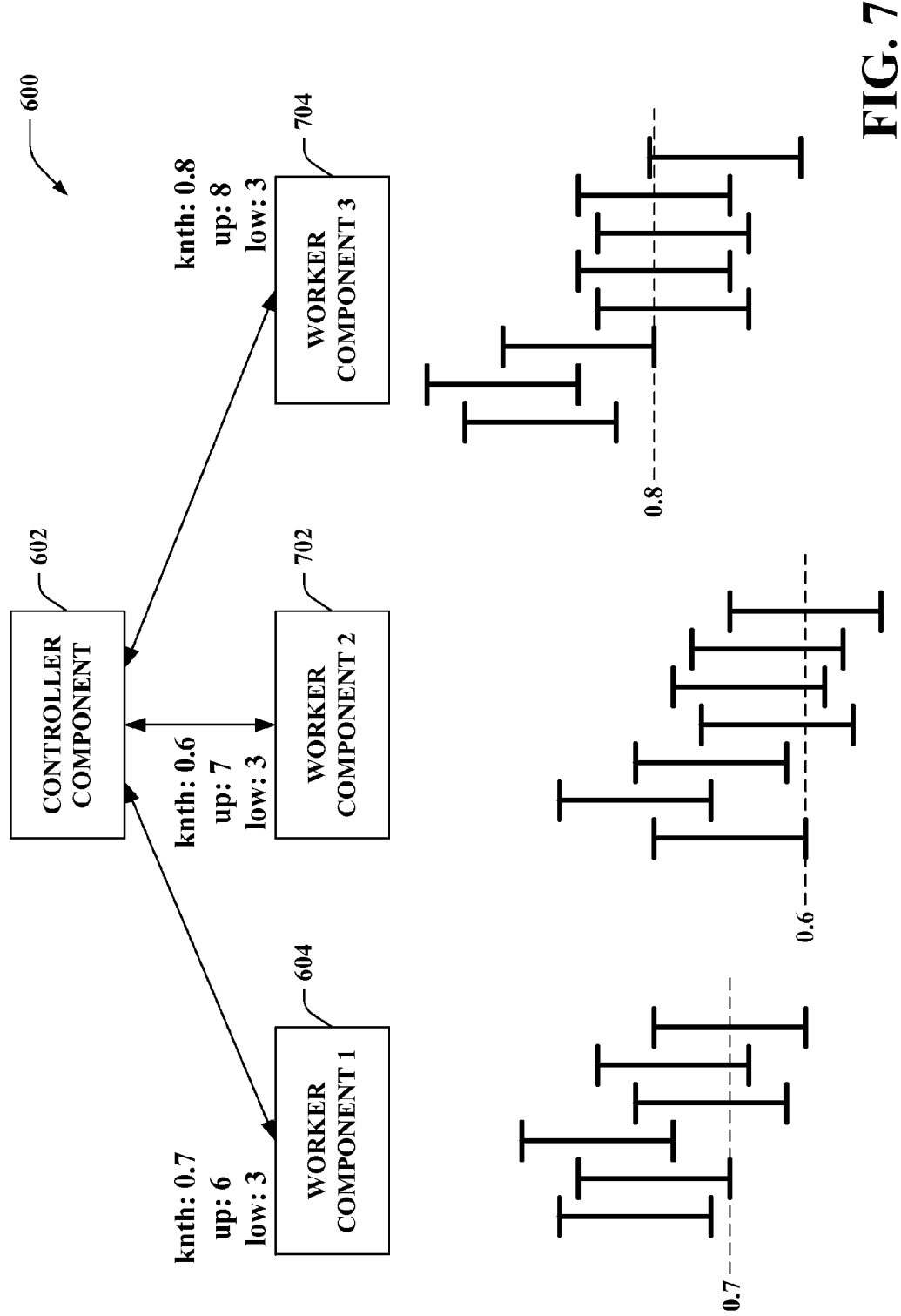
FIGS. 7-8 illustrate an exemplary parallel backward classification of records performed by a system depicted in FIG. 6.
Figure 8:
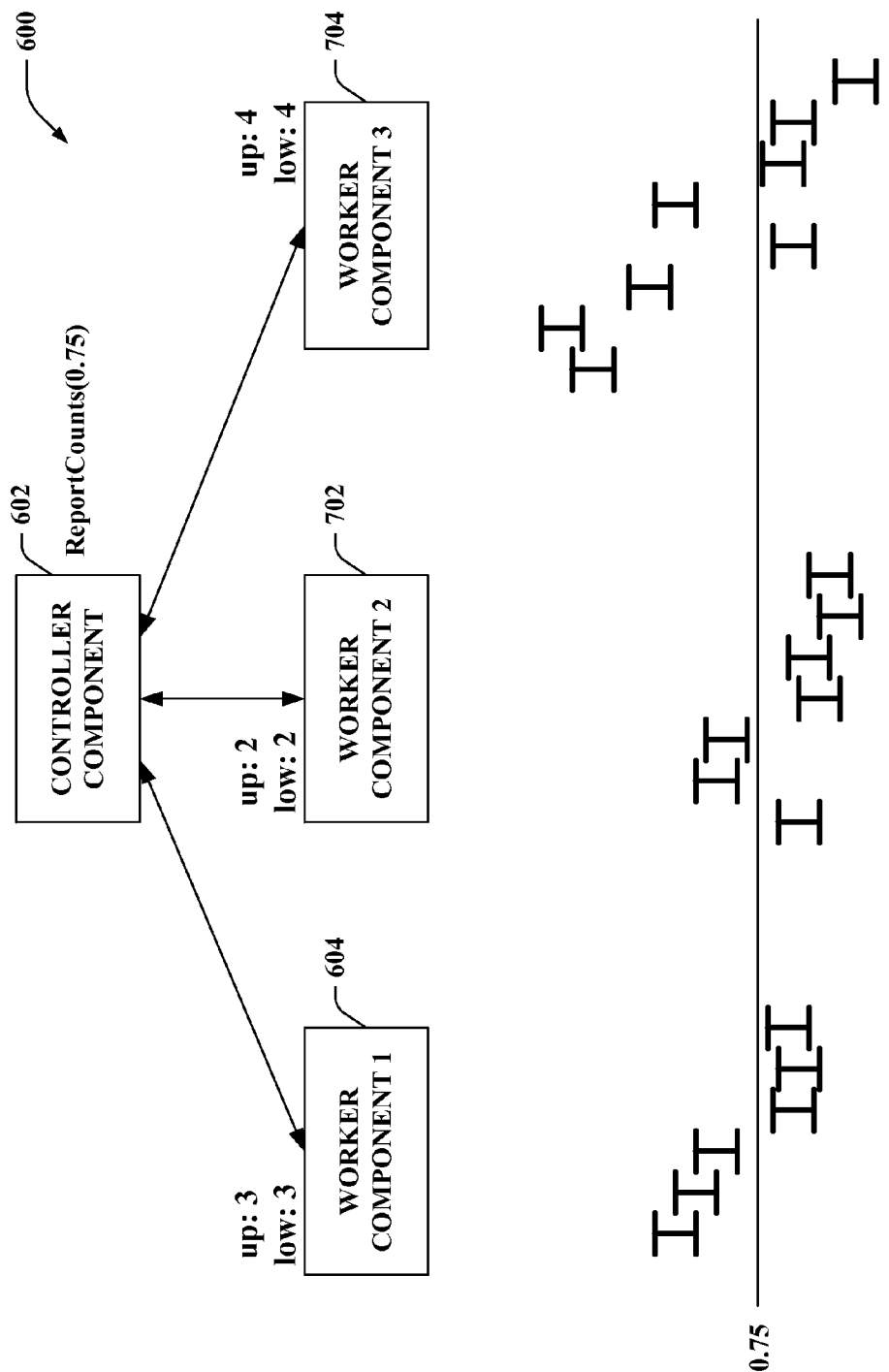

FIGS. 7-8 illustrate an exemplary parallel backward classification of records performed by the system 600 depicted in FIG. 6. It is to be appreciated, however, that the claimed subject matter is not limited to such example.

FIG. 7 illustrates an example of the initialization phase for the system 600 of FIG. 6. In the example of FIG. 7, the system 600 includes three worker components (e.g., the worker component 1 604, a worker component 2 702, and a worker component 3 704). Moreover, a value of a parameter K for the illustrated example is 9. In this example, the worker component 1 604 reports a knth estimate of 0.7, a low count of 3, and an up count of 6. The worker component 2 702 reports a knth estimate of 0.6, a low count of 3, and an up count of 7. Further, the worker 3 704 reports a knth estimate of 0.8, a low count of 3, and an up count of 8. The example of FIG. 7 serves as a running example below in connection with describing the parallel backward algorithm.

Again, reference is made to FIG. 6 and the pseudocode of Algorithm 3 In the threshold search phase (Lines 5-12), the threshold search component 614 can search for a common threshold across the record access log partitions of the worker components 604-606 that yields a final hot set size of K. The threshold search component 614 can use the knth threshold values, up, and low counts reported in the initialization phase as a search space for finding a threshold that yields a hot set of the desired size. The threshold value exists between the highest and lowest knth threshold values reported from the workers components 604-606 in the initialization phase (e.g., in the example of FIG. 7 the threshold exists between 0.6 and 0.8).

In the threshold search phase, two types of commands can be sent by the communication component 612 to the worker components 604-606: a tighten bounds command and a report counts command.

A tighten bounds command (TightenBounds) can be generated by the threshold search component 614 of the controller component 602. Further, a tighten bounds command requests that each worker component 604-606 read back in its record access log partition further in order to tighten the upper and lower bound estimates for its records. Scanning further back in the log provides that the upper and lower bounds for the records will converge and reduce overlap between ranges of records. This means the gap between up and low counts will converge, giving the controller component 602 a better resolution of the number of records in contention for the hot set.

A report counts command (ReportCounts(Q)) can also be generated by the threshold search component 614. A report counts command requests each worker component 604-606 to report up and low counts for a given threshold Q. The threshold search component 614 of the controller component 602 can use this information to test how many records are in contention for the hot set at a given threshold value.

To perform the search, the threshold search component 614 first picks the median threshold value Q reported from the initialization phase (Line 5) and issues a ReportCounts (Q) command to each worker component 604-606 (Line 10). The worker components 604-606 then return low and up counts. The total low count from the worker components 604-606 (tlow) (e.g., sum of low counts from each of the worker components 604-606) represents the lower bound count for records in contention to be in the hot set at threshold Q. Likewise, the total up count (tup) represents the upper bound count for records in contention for the hot set. If tlow is below K (e.g, too few records are in contention), the threshold search component 614 reduces Q in order to yield more records (Line 8). On the other hand, if tlow is above K, the threshold search component 614 increases Q (Line 9). Initially, the threshold search component 614 can choose a new value for Q by taking a next step (greater or less) in the list of threshold values generated in the initialization phase. After such a move causes the tlow count to become too low (or too high), the threshold search component 614 can make incremental half steps (e.g., similar to binary search) between the current Q and previous Q value. After finding a new Q, the threshold search component 614 issues another ReportCounts(Q) command to the worker components 604-606, and new tlow and tup counts are received by the communication component 612.

Moreover, the threshold search component 614 can evaluate an absolute difference between tlow and tup (Line 11). If at a point the absolute difference is determined to be greater than zero, the threshold search component 614 can issue a tighten bounds command for the worker components 604-606 in order to converge the total count resolution. This search process continues until the tlow count is K, and the absolute difference between tup and tlow is equal to zero (Line 12).

To set forth an illustration, the example of FIG. 7 is again referenced. As noted above, K=9. The threshold search phase can begin with the controller component 602 picking an initial threshold value of 0.7 (e.g., the median knth value from the initialization phase). After issuing the command ReportCounts (0.7), the controller component 602 can determine that a value of tup is 21 and a value of tlow is 11. At this point, the difference between tup and tlow is above 0, so the controller component 602 can issue a TightenBounds command. The controller component 602 can also set Q to 0.8 (e.g., a next highest knth value reported during initialization), since tlow is currently greater than K. After issuing the command ReportCounts (0.8), assume that the controller component 602 determines that the value of tlow is 6 and the value of tup is 7. Since the tlow value is now less than K, the controller component 602 can set Q to 0.75 (e.g., the average of the previous and current Q values).

FIG. 8 illustrates an example of the data associated with the system 600 after the controller component 602 issues the command ReportCounts (0.75) in the foregoing example. As depicted, the worker component 1 604 returns up and low counts of 3, the worker component 2 702 returns up and low counts of 2, and the worker component 3 704 returns up and low counts of 4. At this point, tlow=9, tup=9, and the absolute difference between tlow and tup is zero; thus, the controller component 602 ends the search process.

Again, reference is made to FIG. 6 and the pseudocode of Algorithm 3 In the finalization phase (Line 14), the controller component 602 sends the worker a final threshold value Q. Each worker component 604-606 reports to the controller component 602 the record IDs in its respective record access log partition with upper bound values above Q. The controller component 602 returns the union of these record IDs as the hot set.

Generally, in contrast to the data classification techniques described herein, some conventional approaches utilize caching or top-k processing. With a caching approach, hot records are those inside a cache, while other records not in the cache are cold. Various caching algorithms can be used such as, for example, LRU, LRU-k, ARC, 2Q, and others. However, various differences between a caching approach and the data classification techniques set forth herein exist.

For instance, the data classification techniques need not enforce hard deadlines. In contrast, traditional caching replacement policies were designed to meet hard deadlines for evicting pages from the cache in the face of memory pressure. The data classification techniques can be used in an environment where memory is assumed to be sufficient but cold data is purged occasionally for cost and performance reasons. This allows flexibility in how and when to purge data.

Moreover, the data classification techniques can be employed to lower runtime overhead. Thus, such techniques can attempt to minimize bookkeeping overhead in a critical path of a main memory database system. On the contrary, traditional caching techniques update a data structure that maintains page ordering so eviction decisions can be made quickly (e.g., the LRU-k queue with pages ordered by $k^{th}$ access, the "recency" and "frequency" queues in 2Q and ARC, etc.). These structures are typically updated on every page access. In a main memory database using, for example, hash indexes, updating such a structure on every record access may be more expensive than the actual record access. Accordingly, utilization of a caching technique may result in increased runtime overhead.

Further, the data classification techniques set forth herein operate at a granularity of a record. In contrast, many traditional cache designs commonly operate at a granularity of a page (e.g., associated with less memory and update overhead). While other traditional cache techniques may operate at a record or object granularity, these techniques oftentimes constrain the caching decisions for the lower-granularity items (e.g., caching records that are stored in pages that are already in the cache).

Further, traditional caching techniques are commonly constrained by how much they can "remember" about pages that visit the cache. In general, these techniques remember access statistics for pages currently in the cache as well as for a constant number of pages that were recently evicted (e.g., "ghost caches" or retained information periods). However, forgetting access histories can be a detriment to classification accuracy. In contrast, the data classification techniques provided herein are not subject to similar constraints and can consider logged record access information that can enhance classification accuracy.

Moreover, the backward algorithms set forth herein differ from top-k processing. Top-k processing can ranks objects by scoring tuples using a monotonic function applied to one or more of the tuple's attributes. In contrast, the backward algorithms provided herein can estimate access frequencies based on logged record accesses. Moreover, for efficiency, top-k techniques typically assume sorted access to at least a single attribute used to score the tuple. On the contrary, the backward algorithms noted herein scan accesses as they were logged, and do not assume preprocessing or sort order.

Figure 9:
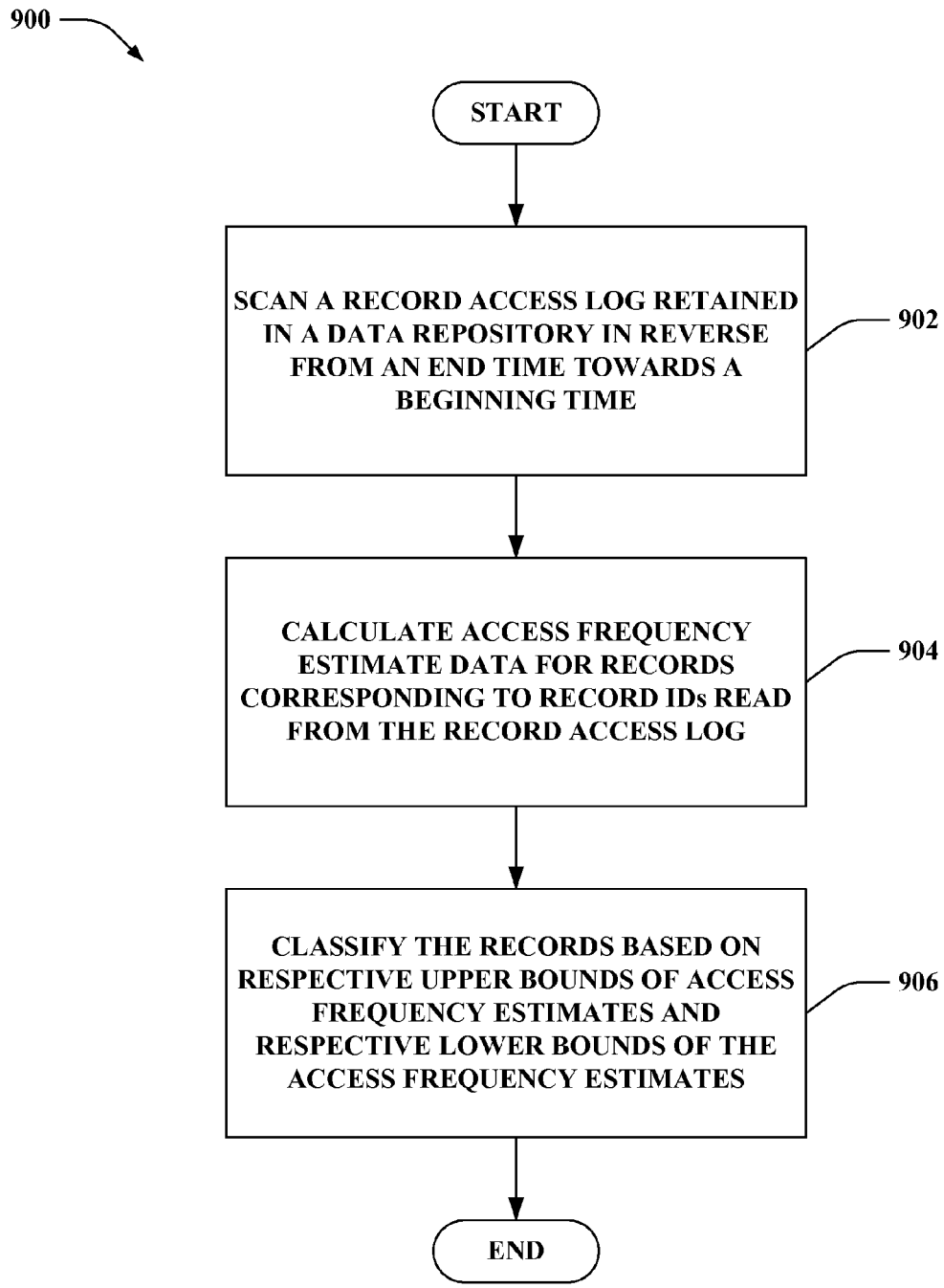
FIG. 9 is a flow diagram that illustrates an exemplary methodology of classifying data in a main memory database system.
Figure 10:
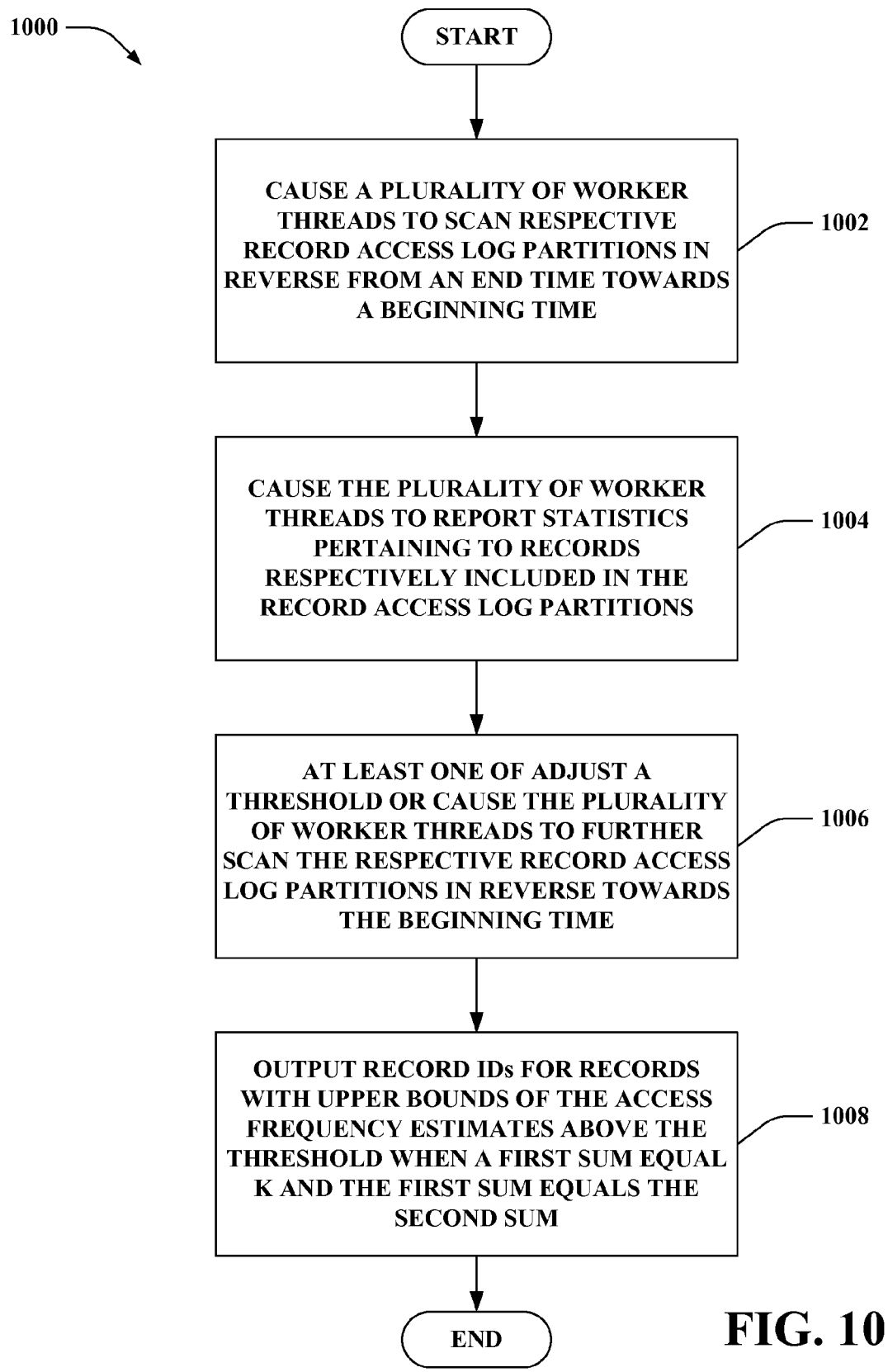
FIG. 10 is a flow diagram that illustrates an exemplary methodology of employing a parallel backward algorithm to classify data in a main memory database system.

FIGS. 9-10 illustrate exemplary methodologies relating to classifying data in a main memory database system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 of classifying data in a main memory database system. At 902, a record access log retained in a data repository can be scanned in reverse from an end time towards a beginning time. The record access log can include a sequence of record access observations logged over a time period from the beginning time to the end time. Moreover, each of the record access observations can include a respective record ID and a read timestamp.

At 904, access frequency estimate data can be calculated for records corresponding to record IDs read from the record access log. The access frequency estimate data, for instance, can include respective upper bounds of access frequency estimates and respective lower bounds of the access frequency estimates for each of the records. According to an example, the access frequency estimates can be based on a weighted average with decreasing weights over time (e.g., exponential smoothing).

At 906, the records can be classified based on the respective upper bounds of the access frequency estimates and the respective lower bounds of the access frequency estimates. For instance, K records can be classified as being frequently access records (e.g., hot records).

FIG. 10 illustrates a methodology 1000 of employing a parallel backward algorithm to classify data in a main memory database system. At 1002, a plurality of worker threads can be caused to scan respective record access log partitions in reverse from an end time towards a beginning time. The respective record access log partitions can comprise respective sequences of record access observations logged over a time period from the beginning time to the end time.

At 1004, the plurality of worker threads can be caused to report statistics pertaining to records respectively included in the record access log partitions. The statistics, for example, can include at least a first number of records that have lower bounds of access frequency estimates above or equal to a threshold and a second number of records that have upper bounds of the access frequency estimates above the threshold.

At 1006, until a first sum of the first number of records reported from the plurality of worker threads equals K, and until the first sum of the first number of records reported from the plurality of worker threads equals a second sum of the second number of records reported from the plurality of worker threads, a threshold can be adjusted and/or the plurality of worker threads can be caused to further scan the respective record access log partitions in reverse towards the beginning time. At 1008, record IDs for records with upper bounds of the access frequency estimates above the threshold can be outputted when the first sum equals K and the first sum equals the second sum.

Figure 11:
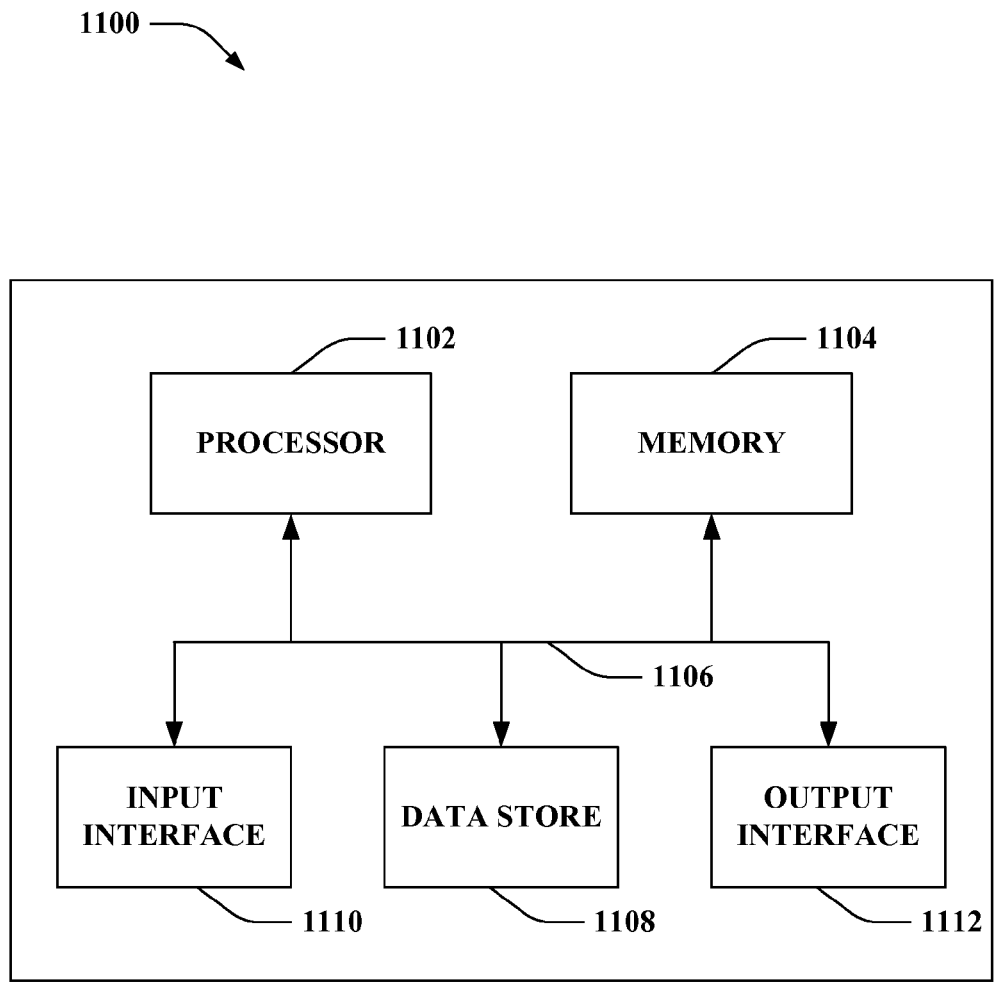
FIG. 11 illustrates an exemplary computing device.

Referring now to FIG. 11, a high-level illustration of an exemplary computing device 1100 that can be used in accordance with the systems and methodologies disclosed herein is illustrated. For instance, the computing device 1100 may be used in a system that classifies data in a main memory database system. For instance, the system may employ a backward algorithm or a parallel backward algorithm. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store a record access log, record access log partition(s), table(s) that include access frequency estimate data, and so forth.

The computing device 1100 additionally includes a data store 1108 that is accessible by the processor 1102 by way of the system bus 1106. The data store 1108 may include executable instructions, a record access log, record access log partition(s), table(s) that include access frequency estimate data, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of classifying data in a main memory database system, comprising:

initiating scanning of a record access log retained in a data repository in reverse from an end time towards a beginning time utilizing at least one processor, wherein the record access log comprises a sequence of record access observations logged over a time period from the beginning time to the end time, wherein each of the record access observations comprises a respective record identifier (ID) and a read timestamp;

calculating access frequency estimate data for records corresponding to record IDs read from the record access log as the record access log is scanned in reverse, wherein the access frequency estimate data comprises respective upper bounds of access frequency estimates and respective lower bounds of the access frequency estimates for each of the records;

storing, in the data repository, the access frequency estimate data for the records corresponding to the record IDs read from the record access log;

classifying the records based on the respective upper bounds of the access frequency estimates and the respective lower bounds of the access frequency estimates as the record access log is scanned in reverse, wherein K records are classified as being frequently accessed records;

continuing the scanning of the record access log in reverse, the calculating of the access frequency estimate data for the records as the record access log is scanned in reverse, and the classifying of the records as the record access log is scanned in reverse;

discontinuing the scanning of the record access log based on classification of the records, the scanning being discontinued prior to reading a record access observation for the beginning time; and removing, from the data repository, the access frequency estimate data for a subset of the records as the record access log is scanned in reverse.

2. The method of claim 1, wherein the access frequency estimates are based on a weighted average with decreasing weights over time.

3. The method of claim 1, wherein the access frequency estimates are based on exponential smoothing.

4. The method of claim 1, wherein classifying the records based on the respective upper bounds of the upper frequency estimates and the respective lower bounds of the access frequency estimates as the record access log is scanned in reverse further comprises:

identifying a $k^{th}$ lower bound from the respective lower bounds of the access frequency estimates based on a value of K;

determining a number of the respective upper bounds of the access frequency estimates that are greater than the $k^{th}$ lower bound;

continuing the scanning of the record access log in reverse when the number of the respective upper bounds of the access frequency estimates greater than the $k^{th}$ lower bound is more than K; and discontinuing the scanning of the record access log and outputting K record IDs associated with the respective upper bounds of the access frequency estimates greater than the $k^{th}$ lower bound when the number of the respective upper bounds of the access frequency estimates greater than the $k^{th}$ lower bound is K.

5. The method of claim 4, further comprising successively refining the respective upper bounds of the access frequency estimates and the respective lower bounds of the access frequency estimates when continuing to scan the record access log in reverse.

6. The method of claim 1, wherein the access frequency estimate data for the records corresponding to the record IDs read from the record access log is stored in a table, the method further comprising:

identifying a $k^{th}$ lower bound from the respective lower bounds of the access frequency estimates based on a value of K;

wherein the subset of the records for which the access frequency estimate data is removed have respective upper bounds of access frequency estimates that are lower than the $k^{th}$ lower bound.

7. The method of claim 1, further comprising:

determining an accept threshold, wherein the accept threshold represents a time slice in the record access log; and discarding a previously unseen record read during scanning at or beyond the accept threshold.

8. The method of claim 7, wherein the accept threshold is a function of a $k^{th}$ lower bound from the respective lower bounds of the access frequency estimates.

9. The method of claim 1, wherein the record access log comprises a sample of accesses of records.

10. The method of claim 1, further comprising calculating the respective upper bounds of the access frequency estimates at a given time slice by assuming that the corresponding record is encountered at every time slice moving backward in the record access log from the given time slice.

11. The method of claim 1, further comprising calculating the respective lower bounds of the access frequency estimates at a given time slice by assuming that the corresponding record is not encountered again moving backward in the record access log from the time slice.

12. The method of claim 1, wherein the record access log is divided into n record access log partitions, further comprising:

scanning the n record access log partitions in reverse; and calculating the access frequency estimate data for respective records read from each of the record access log partitions in parallel as the record access log partitions are scanned in reverse.

13. A system that classifies data in a main memory database system, comprising:

a data repository that comprises a record access log, wherein the record access log comprises a sequence of record access observations logged over a time period from a beginning time to an end time, wherein each of the record access observations comprises a respective record identifier (ID) and access timestamp;

at least one processor; and memory that comprises computer-executable instructions that, when executed by the at least one processor, cause the at least one processor to perform acts including:

initiating scanning of the record access log in reverse from the end time towards the beginning time;

calculating access frequency estimate data for records corresponding to record IDs read from the record access log as the record access log is scanned in reverse, wherein the access frequency estimate data comprises respective upper bounds of access frequency estimates and respective lower bounds of the access frequency estimates for each of the records, wherein the access frequency estimates are based on exponential smoothing;

classifying the records based on the respective upper bounds of the access frequency estimates and the respective lower bounds of the access frequency estimates as the record access log is scanned in reverse, wherein K records are classified as being frequently accessed records;

continuing the scanning of the record access log in reverse, the calculating of the access frequency estimate data as the record access log is scanned in reverse, and the classifying of the records as the record access log is scanned in reverse; and discontinuing the scanning of the record access log prior to reading a record access observation for the beginning time, the scanning being discontinued based on classification of the records.

14. The system of claim 13, the memory further comprising computer-executable instructions that, when executed by the at least one processor, cause the at least one processor to perform acts including:

determining an accept threshold; and discarding a previously unseen record read during scanning at or beyond the accept threshold, wherein the accept threshold represents a time slice in the record access log.

15. The system of claim 13, the data repository further comprising a table that retains the access frequency estimate data for the records corresponding to the record IDs read from the record access log; and the memory further comprising computer-executable instructions that, when executed by the at least one processor, cause the at least one processor to perform acts including:

identifying a $k^{th}$ lower bound from the respective lower bounds of the access frequency estimates based on a value of K; and removing the access frequency estimate data for a subset of the records that have respective upper bounds of access frequency estimates that are lower than the $k^{th}$ lower bound.

16. The system of claim 13, the memory further comprising computer-executable instructions that, when executed by the at least one processor, cause the at least one processor to perform acts including:

identifying a $k^{th}$ lower bound from the respective lower bounds of the access frequency estimates based on a value of K;

determining a number of the respective upper bounds of the access frequency estimates that are greater than the $k^{th}$ lower bound;

continuing the scanning of the record access log in reverse when the number of the respective upper bounds of the access frequency estimates greater than the $k^{th}$ lower bound is more than K; and discontinuing the scanning of the record access log and outputting K record IDs associated with the respective upper bounds of the access frequency estimates greater than the $k^{th}$ lower bound when the number of the respective upper bounds of the access frequency estimates greater than the $k^{th}$ lower bound is K.

17. The system of claim 13, wherein the record access log is divided into record access log partitions, wherein scanning the record access log in reverse from the end time towards the beginning time further comprises causing worker threads to scan respective record access log partitions in reverse from the end time towards the beginning time; and the memory further comprising computer-executable instructions that, when executed by the at least one processor, cause the at least one processor to perform acts including:

managing the worker threads to report statistics pertaining to records respectively included in the record access log partitions; and identifying the K records as being frequently accessed records based upon the statistics received from the worker threads.

18. The system of claim 17, the memory further comprising computer-executable instructions that, when executed by the at least one processor, cause the at least one processor to perform acts including:

issuing a command that requests upper and lower bound counts around a given threshold from the worker threads.

19. The system of claim 17, the memory further comprising computer-executable instructions that, when executed by the at least one processor, cause the at least one processor to perform acts including:

issuing a command that requests that the worker threads read back in the record access log partitions to cause upper and lower bounds to converge.

20. A computer-readable storage device including computer-executable instructions that, when executed by a processor, cause the processor to perform acts including:

causing a plurality of worker threads to scan respective record access log partitions in reverse from an end time towards a beginning time, wherein the respective record access log partitions comprises respective sequences of record access observations logged over a time period from the beginning time to the end time;

causing the plurality of worker threads to report statistics pertaining to records respectively included in the record access log partitions, wherein the statistics comprise at least a first number of records that have lower bounds of access frequency estimates above or equal to a threshold and a second number of records that have upper bounds of the access frequency estimates above the threshold;

until a first sum of the first number of records reported from the plurality of worker threads equals K, and until the first sum of the first number of records reported from the plurality of worker threads equals a second sum of the second number of records reported from the plurality of worker threads, at least one of:

adjusting the threshold; or causing the plurality of worker threads to further scan the respective record access log partitions in reverse towards the beginning time; and outputting record identifiers (IDs) for records with upper bounds of the access frequency estimates above the threshold when the first sum equals K and the first sum equals the second sum.

* * * * *